United States Patent
Aragón et al.

(10) Patent No.: US 11,057,500 B2
(45) Date of Patent: Jul. 6, 2021

(54) PUBLICATION OF APPLICATIONS USING SERVER-SIDE VIRTUAL SCREEN CHANGE CAPTURE

(71) Applicant: ASG Technologies Group, Inc., Naples, FL (US)

(72) Inventors: Francisco Aragón, Barcelona (ES); Raul Sánchez, Barcelona (ES); Jaime Crespo, Barcelona (ES); Oscar Santillana, Barcelona (ES)

(73) Assignee: ASG Technologies Group, Inc., Naples, FL (US)

( * ) Notice: Subject to any disclaimer, the term of this patent is extended or adjusted under 35 U.S.C. 154(b) by 147 days.

(21) Appl. No.: 15/818,160

(22) Filed: Nov. 20, 2017

(65) Prior Publication Data
US 2019/0158630 A1   May 23, 2019

(51) Int. Cl.
*H04L 29/06* (2006.01)
*H04L 29/08* (2006.01)
(Continued)

(52) U.S. Cl.
CPC .............. *H04L 67/42* (2013.01); *G06F 3/147* (2013.01); *G06F 3/1454* (2013.01); *G09G 5/00* (2013.01);
(Continued)

(58) Field of Classification Search
None
See application file for complete search history.

(56) References Cited

U.S. PATENT DOCUMENTS

| 5,528,263 A | 6/1996 | Platzker et al. |
| 5,742,285 A | 4/1998 | Ueda |

(Continued)

FOREIGN PATENT DOCUMENTS

| EP | 3430529 A1 | 1/2019 |
| EP | 3732566 | 11/2020 |

(Continued)

OTHER PUBLICATIONS

"International Search Report" and "Written Opinion of the International Searching Authority," Patent Cooperation Treaty Application No. PCT/US2017/022295, dated Jun. 1, 2017, 9 pages.
(Continued)

*Primary Examiner* — Natisha D Cox
(74) *Attorney, Agent, or Firm* — Carr & Ferrell LLP

(57) ABSTRACT

Provided are computer-implemented methods and systems for optimization of publication of an application to a web browser. An example method for optimization of publication of an application to a web browser may include capturing, by a server-side agent, a video frame of a virtual screen associated with the application. The method may further include comparing, by the server-side agent, the video frame to a previous video frame of the virtual screen to detect a change in the video frame. The method may continue with generating, by the server-side agent, an image of the change based on the detection. The method may further include sending, by the server-side agent, the image of the change to a client device. The virtual screen may be re-rendered on the client device based on the image of the change and the previous video frame.

17 Claims, 7 Drawing Sheets

(51) Int. Cl.
*G06F 3/14* (2006.01)
*G06F 3/147* (2006.01)
*G09G 5/00* (2006.01)

(52) U.S. Cl.
CPC ............ *G09G 5/001* (2013.01); *H04L 67/02* (2013.01); *H04L 67/1002* (2013.01); *H04L 67/125* (2013.01); *H04L 67/141* (2013.01); *G09G 2340/02* (2013.01); *G09G 2340/16* (2013.01); *G09G 2350/00* (2013.01); *G09G 2370/022* (2013.01)

(56) References Cited

U.S. PATENT DOCUMENTS

| | | | |
|---|---|---|---|
| 6,069,957 | A | 5/2000 | Richards |
| 6,331,855 | B1* | 12/2001 | Schauser ............... G06F 3/1462 345/502 |
| 6,950,825 | B2 | 9/2005 | Chang et al. |
| 7,937,665 | B1 | 5/2011 | Vazquez et al. |
| 9,032,076 | B2 | 5/2015 | Buehler et al. |
| 9,213,707 | B2 | 12/2015 | Conner |
| 9,483,537 | B1 | 11/2016 | Peters et al. |
| 10,162,624 | B1 | 12/2018 | Moturu et al. |
| 10,318,762 | B1 | 6/2019 | Buckingham et al. |
| 10,877,740 | B2 | 12/2020 | Bennet et al. |
| 2003/0046401 | A1 | 3/2003 | Abbott et al. |
| 2004/0003119 | A1 | 1/2004 | Munir et al. |
| 2004/0128001 | A1 | 7/2004 | Levin et al. |
| 2004/0177323 | A1 | 9/2004 | Kaasila et al. |
| 2006/0031854 | A1* | 2/2006 | Godwin ................ G06F 3/1462 719/328 |
| 2006/0039466 | A1 | 2/2006 | Emerson et al. |
| 2006/0111888 | A1 | 5/2006 | Hiew et al. |
| 2006/0184925 | A1 | 8/2006 | Ficatier et al. |
| 2006/0271528 | A1 | 11/2006 | Gorelik |
| 2007/0016624 | A1 | 1/2007 | Powers et al. |
| 2007/0028286 | A1 | 2/2007 | Greene et al. |
| 2007/0156764 | A1 | 7/2007 | O'Connell et al. |
| 2007/0180444 | A1 | 8/2007 | Hoover et al. |
| 2007/0198450 | A1 | 8/2007 | Khalsa |
| 2007/0208685 | A1 | 9/2007 | Blumenau |
| 2009/0083306 | A1 | 3/2009 | Sichi et al. |
| 2009/0124387 | A1* | 5/2009 | Perlman ................ A63F 13/335 463/42 |
| 2010/0106560 | A1 | 4/2010 | Li et al. |
| 2010/0114628 | A1 | 5/2010 | Adler et al. |
| 2010/0225658 | A1 | 9/2010 | Coleman |
| 2010/0226441 | A1* | 9/2010 | Tung ................ H04N 19/132 375/240.24 |
| 2010/0231599 | A1 | 9/2010 | Tung et al. |
| 2010/0245563 | A1* | 9/2010 | Golovchinsky .......... H04N 7/18 348/135 |
| 2010/0250497 | A1 | 9/2010 | Redlich et al. |
| 2010/0274815 | A1 | 10/2010 | Vanasco |
| 2011/0107298 | A1 | 5/2011 | Sebastian |
| 2011/0246904 | A1 | 10/2011 | Pinto et al. |
| 2012/0075333 | A1* | 3/2012 | Chen ................ G06F 3/1462 345/619 |
| 2012/0310875 | A1 | 12/2012 | Prahlad et al. |
| 2013/0117662 | A1* | 5/2013 | Shan ................ G09G 5/34 715/243 |
| 2013/0151557 | A1 | 6/2013 | Shanken et al. |
| 2013/0332423 | A1 | 12/2013 | Puri et al. |
| 2014/0032875 | A1 | 1/2014 | Butler |
| 2014/0047011 | A1* | 2/2014 | Lahav ................ H04L 67/00 709/203 |
| 2014/0047413 | A1 | 2/2014 | Sheive et al. |
| 2014/0089388 | A1* | 3/2014 | Curry ................ H04L 67/42 709/203 |
| 2014/0114907 | A1 | 4/2014 | Kozina et al. |
| 2014/0114962 | A1 | 4/2014 | Rosenburg et al. |
| 2014/0282453 | A1 | 9/2014 | O'Rourke et al. |
| 2015/0012478 | A1 | 1/2015 | Mohammad et al. |
| 2015/0127660 | A1 | 5/2015 | Zilberberg et al. |
| 2015/0293764 | A1 | 10/2015 | Visvanathan |
| 2015/0379303 | A1 | 12/2015 | LaFever et al. |
| 2016/0044380 | A1 | 2/2016 | Barrett |
| 2016/0117159 | A1 | 4/2016 | Balko |
| 2016/0267082 | A1 | 9/2016 | Wong et al. |
| 2016/0275439 | A1 | 9/2016 | Avats |
| 2016/0359711 | A1 | 12/2016 | Deen et al. |
| 2017/0068395 | A1 | 3/2017 | Massoudi |
| 2017/0123751 | A1* | 5/2017 | Sigur sson ............ G06F 3/0481 |
| 2017/0180284 | A1 | 6/2017 | Smullen et al. |
| 2017/0228119 | A1 | 8/2017 | Hosbettu et al. |
| 2017/0269972 | A1 | 9/2017 | Hosabettu et al. |
| 2017/0270022 | A1 | 9/2017 | Moresmau et al. |
| 2017/0339564 | A1 | 11/2017 | Momchilov et al. |
| 2017/0357814 | A1 | 12/2017 | Mahaffey et al. |
| 2018/0167426 | A1* | 6/2018 | Sigurdsson ............... G06F 3/14 |
| 2018/0191761 | A1 | 7/2018 | Lee et al. |
| 2018/0367506 | A1 | 12/2018 | Ford et al. |
| 2019/0205111 | A1 | 7/2019 | Bennet et al. |
| 2019/0208031 | A1 | 7/2019 | Bennet et al. |
| 2019/0238467 | A1 | 8/2019 | Guan et al. |
| 2019/0238688 | A1 | 8/2019 | Bermundo et al. |
| 2019/0243742 | A1 | 8/2019 | Natari |
| 2020/0050983 | A1 | 2/2020 | Balasubramanian et al. |
| 2020/0409665 | A1 | 12/2020 | Swaminathan et al. |
| 2021/0037110 | A1 | 2/2021 | Bennet et al. |

FOREIGN PATENT DOCUMENTS

| | | |
|---|---|---|
| EP | 3732582 | 11/2020 |
| WO | WO2008003593 A1 | 1/2008 |
| WO | WO2015139119 A1 | 9/2015 |
| WO | WO2015154133 A1 | 10/2015 |
| WO | WO2017147694 A1 | 9/2017 |
| WO | WO2017160831 A1 | 9/2017 |
| WO | WO2019133208 A1 | 7/2019 |
| WO | WO2019133209 A1 | 7/2019 |
| WO | WO2020263573 A1 | 12/2020 |

OTHER PUBLICATIONS

"International Search Report" and "Written Opinion of the International Searching Authority," Patent Cooperation Treaty Application No. PCT/US2018/056196, dated Dec. 26, 2018, 8 pages.

"International Search Report" and "Written Opinion of the International Searching Authority," Patent Cooperation Treaty Application No. PCT/US2018/064127, dated Feb. 11, 2019, 6 pages.

"International Search Report" and "Written Opinion of the International Searching Authority," Patent Cooperation Treaty Application No. PCT/US2018/064122, dated Mar. 18, 2019, 8 pages.

"Extended European Search Report" and "Written Opinion", European Application No. 17767331.6, dated Nov. 14, 2019, 6 pages.

"International Search Report" and "Written Opinion of the International Searching Authority," Patent Cooperation Treaty Application No. PCT/US2020/053141, dated Jan. 12, 2021, 8 pages.

"International Search Report" and "Written Opinion of the International Searching Authority," Patent Cooperation Treaty Application No. PCT/US2020/053419, dated Jan. 14, 2021, 14 pages.

"International Search Report" and "Written Opinion of the International Searching Authority," Patent Cooperation Treaty Application No. PCT/US2020/053138, dated Jan. 12, 2021, 8 pages.

"International Search Report" and "Written Opinion of the International Searching Authority," Patent Cooperation Treaty Application No. PCT/US2020/053139, dated Jan. 11, 2021, 8 pages.

"International Search Report" and "Written Opinion of the International Searching Authority," Patent Cooperation Treaty Application No. PCT/US2020/056026, dated Jan. 19, 2021, 16 pages.

"International Search Report" and "Written Opinion of the International Searching Authority," Patent Cooperation Treaty Application No. PCT/US2020/055829, dated Jan. 19, 2021, 18 pages.

"International Search Report" and "Written Opinion of the International Searching Authority," Patent Cooperation Treaty Application No. PCT/US2020/055418, dated Jan. 28, 2021, 8 pages.

(56) References Cited

OTHER PUBLICATIONS

"International Search Report" and "Written Opinion of the International Searching Authority," Patent Cooperation Treaty Application No. PCT/US2020/055420, dated Feb. 1, 2021, 8 pages.

* cited by examiner

PUBLICATION OF APPLICATIONS USING SERVER-SIDE VIRTUAL SCREEN CHANGE CAPTURE

FIELD

This application relates generally to data processing and more specifically to systems and methods for publication of applications using server-side virtual screen change capture.

BACKGROUND

Web or cloud-based applications have gained widespread popularity. Publication of an application to a web browser typically uses a combination of server and client-side technologies. While the backend application server provides the heavy lifting for the core functionality of the application, the web browser and server-side scripts render the application's user interface on the client device.

Conventionally, to render a user interface on the client device, a video is continuously streamed from the application server to the client device. However, the continuous streaming results in consumption of a large amount of network bandwidth and computing resources on both client and server sides.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

Provided are computer-implemented methods and systems for optimization of publication of an application to a web browser. In some example embodiments, a method for optimization of publication of an application to a web browser may include capturing, by a server-side agent, a video frame of a virtual screen associated with the application. The method may further include comparing, by the server-side agent, the video frame to a previous video frame of the virtual screen to detect a change in the video frame. The method may continue with generating, by the server-side agent, an image of the change based on the detection. The method may further include sending, by the server-side agent, the image of the change to the client device. The virtual screen may be re-rendered on the client device based on the image of the change and the previous video frame.

In some example embodiments, a system for optimization of publication of an application to a web browser may include an application server and a server-side agent. The application server may be configured to run the application. The server-side agent may be configured to capture a video frame of a virtual screen associated with the application. The server-side agent may be further configured to compare the video frame to a previous video frame of the virtual screen to detect a change in the video frame. Based on the detection, the server-side agent may generate an image of the change. The server-side agent may be further configured to send the image of the change to the client device. The virtual screen may be re-rendered on the client device based on the image of the change and the previous video frame.

Additional objects, advantages, and novel features will be set forth in part in the detailed description section of this disclosure, which follows, and in part will become apparent to those skilled in the art upon examination of this specification and the accompanying drawings or may be learned by production or operation of the example embodiments. The objects and advantages of the concepts may be realized and attained by means of the methodologies, instrumentalities, and combinations particularly pointed out in the appended claims.

BRIEF DESCRIPTION OF THE DRAWINGS

Exemplary embodiments are illustrated by way of example and not limitation in the figures of the accompanying drawings, in which like references indicate similar elements.

DETAILED DESCRIPTION

Figure 1:
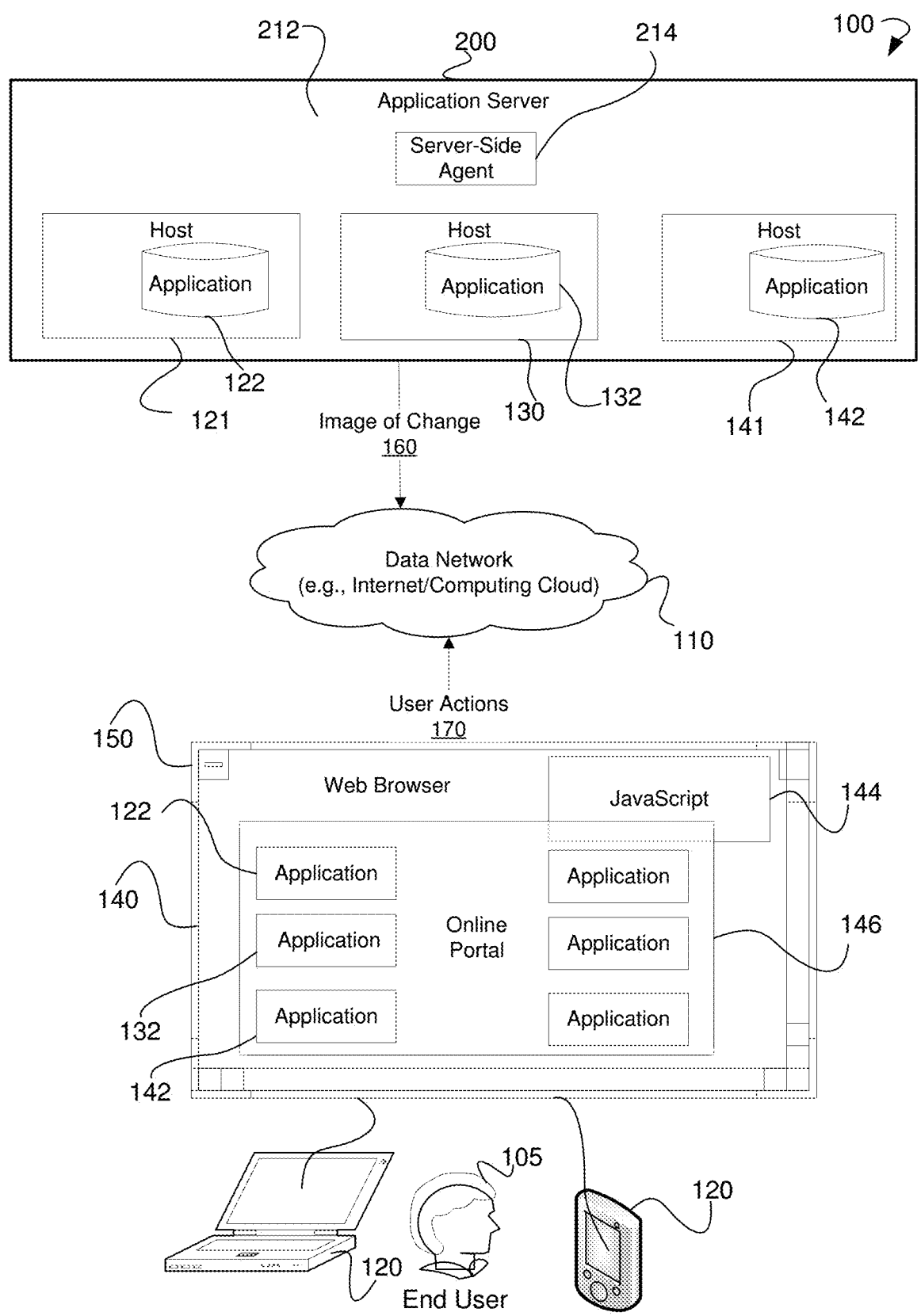
FIG. 1 illustrates an environment within which methods and systems for optimization of publication of an application to a web browser can be implemented, according to an example embodiment.

The following detailed description includes references to the accompanying drawings, which form a part of the detailed description. The drawings show illustrations in accordance with exemplary embodiments. These exemplary embodiments, which are also referred to herein as "examples," are described in enough detail to enable those skilled in the art to practice the present subject matter. The embodiments can be combined, and other embodiments can be formed, by introducing structural and logical changes without departing from the scope of what is claimed. The following detailed description is, therefore, not to be taken in a limiting sense and the scope is defined by the appended claims and their equivalents.

In this document, the terms "a" or "an" are used, as is common in patent documents, to include one or more than one. In this document, the term "or" is used to refer to a nonexclusive "or," such that "A or B" includes "A but not B," "B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

Provided are computer-implemented methods and systems for optimization of publication of an application to a web browser. According to these methods and systems, the application (e.g., a native Windows application) may be running on an application server. An end-user device, also referred herein to as a client device, may have a web browser configured to communicate with the application server via a network. A network session associated with the application can be established between the client and the application server. Upon initiation of the network session, the application can be launched on the application server. The network session may be a Hypertext Transfer Protocol (HTTP) session. Conventionally, a user interface of the application is streamed to the web browser using Hypertext Markup Language (HTML), such as, for example, HTML5 and JavaScript running on the browser.

According to one example embodiment, the application server may include a server-side agent to capture a virtual screen associated with the application running on the application server. Capturing the virtual screen may include capturing video frames shown on the virtual screen associated with the application.

According to an example embodiment of the disclosure, a frame of the virtual screen captured by the server-side agent can be compared to a previously captured frame of the virtual screen. Based on the comparison, the server-side agent may determine that there is a change between the two frames and, based on the determination, generate an image of the change. The server-side agent may then send the generated image of the change to the client device. The web browser of the client device may run a script to merge the image of the change and the previously captured frame of the virtual screen and re-render the virtual screen on the client device. Thus, instead of continuously streaming the video of the virtual screen, the application server can just provide changes (if any) between subsequent frames of the virtual screen, thereby greatly reducing data bandwidth needed to render the virtual screen on the client device. The end user can remain process-agnostic as the user interface is rendered as if it was continuously streamed.

From time to time, the end user may perform actions with respect to the application, such as, for example, touch a touchscreen or provide a user input via a computer keyboard or mouse. The web browser may sense a user action and send the user action to the application server. In response, the application server may execute a command corresponding to the user action on the application. The command executed in the application may result in a change in the virtual screen of the application. The server-side agent may then send the image of the change to the web browser of the client device, where the process of re-rendering of the virtual screen on the client device is performed as described above. Thus, in this case, the end user sees the virtual screen changed by the application server in response to the user action. It should be understood that the technology described herein is not limited to a single application and, in some example embodiments, a plurality of applications can be simultaneously published to the web browser of the client device. This plurality of applications can be, for example, a group of workspace applications selected by the end user.

Thus, with the help of a web browser and a script (e.g., JavaScript) running on the web browser, a client device may act as a remote terminal for viewing the virtual screen of an application without having the application server continuously stream the virtual screen of the application to the web browser as video data. Instead, the application server will only send images of changes in the virtual screen. Accordingly, the bandwidth consumed by rendering the virtual screen of the application on the client device is considerably reduced.

Referring now to the drawings, FIG. 1 illustrates an environment 100 within which methods and systems for optimization of publication of an application to a web browser can be implemented. The environment 100 may include a data network 110 (e.g., an Internet or a computing cloud), an end user 105, a client device 120 shown as a laptop or a smartphone associated with the end user 105, and a system 200 for optimization of publication of an application to a web browser. The system 200 may include an application server 212 and a server-side agent 214 running on the application server 212. The application server 212 may have a plurality of hosts 121, 130, 141 for a plurality of applications 122, 132, 142. The client device 120 may have a user interface 150. Furthermore, a web browser 140 may be running on the client device 120 and may be displayed using the user interface 150. The web browser 140 may communicate with the application server 212 via the data network 110.

The data network 110 may include the Internet or any other network capable of communicating data between devices. Suitable networks may include or interface with any one or more of, for instance, a local intranet, a corporate data network, a data center network, a home data network, a Personal Area Network, a Local Area Network (LAN), a Wide Area Network (WAN), a Metropolitan Area Network, a virtual private network, a storage area network, a frame relay connection, an Advanced Intelligent Network connection, a synchronous optical network connection, a digital T1, T3, E1 or E3 line, Digital Data Service connection, Digital Subscriber Line connection, an Ethernet connection, an Integrated Services Digital Network line, a dial-up port such as a V.90, V.34 or V.34bis analog modem connection, a cable modem, an Asynchronous Transfer Mode connection, or a Fiber Distributed Data Interface or Copper Distributed Data Interface connection. Furthermore, communications may also include links to any of a variety of wireless networks, including Wireless Application Protocol, General Packet Radio Service, Global System for Mobile Communication, Code Division Multiple Access or Time Division Multiple Access, cellular phone networks, Global Positioning System, cellular digital packet data, Research in Motion, Limited duplex paging network, Bluetooth radio, or an IEEE 802.11-based radio frequency network. The data network can further include or interface with any one or more of a Recommended Standard 232 (RS-232) serial connection, an IEEE-1394 (FireWire) connection, a Fiber Channel connection, an IrDA (infrared) port, a Small Computer Systems Interface connection, a Universal Serial Bus (USB) connection or other wired or wireless, digital or analog interface or connection, mesh or Digi® networking.

The web browser 140 may use JavaScript 144 to display a web page associated with an online portal 146. The online portal 146 may be a workspace portal containing a plurality of applications 122, 132, 142 running on the application server 212. Upon selection of one of the applications 122, 132, 142 by the end user 105, the web browser 140 may generate virtual screens based on data received from the application server 212 and display the generated virtual screens to the end user 105. Specifically, the server-side agent 214 may send an image of a change 160 in the virtual screens to the web browser 140. The image of the change 160 is a difference between a previous virtual screen and a current virtual screen related to one of the applications 122, 132, 142. The web browser 140 may generate the virtual screen based on the image of the previous virtual screen and the image of the change 160.

The end user 105 may provide user actions 170 using the client device 120. The web browser 140 may send data related to the user actions 170 to the application server 212. The application server 212 may execute a command on the application corresponding to the user actions 170.

Figure 2:
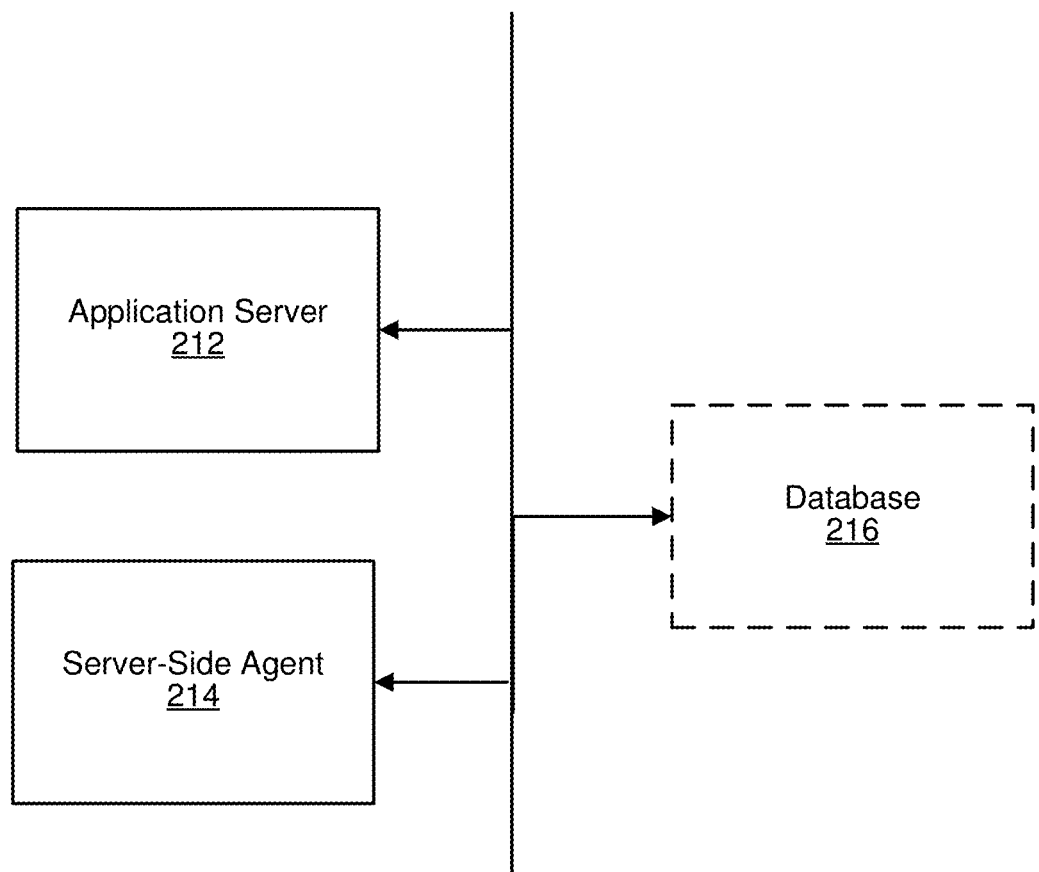
FIG. 2 is a block diagram of a system for optimization of publication of an application to a web browser, according to an example embodiment.

FIG. 2 shows a block diagram illustrating various modules of a system 200 for optimization of publication of an application to a web browser, according to an example embodiment. The system 200 may include an application server 212, a server-side agent 214, and, optionally, a database 216. The application server 212 may be configured to run applications. The database 216 may store data associated with the application server 212, the server-side agent 214, and a plurality of applications running on the application server 212. The operations performed by each of the modules of the system 200 are further described with reference to FIGS. 3-6.

Figure 3:
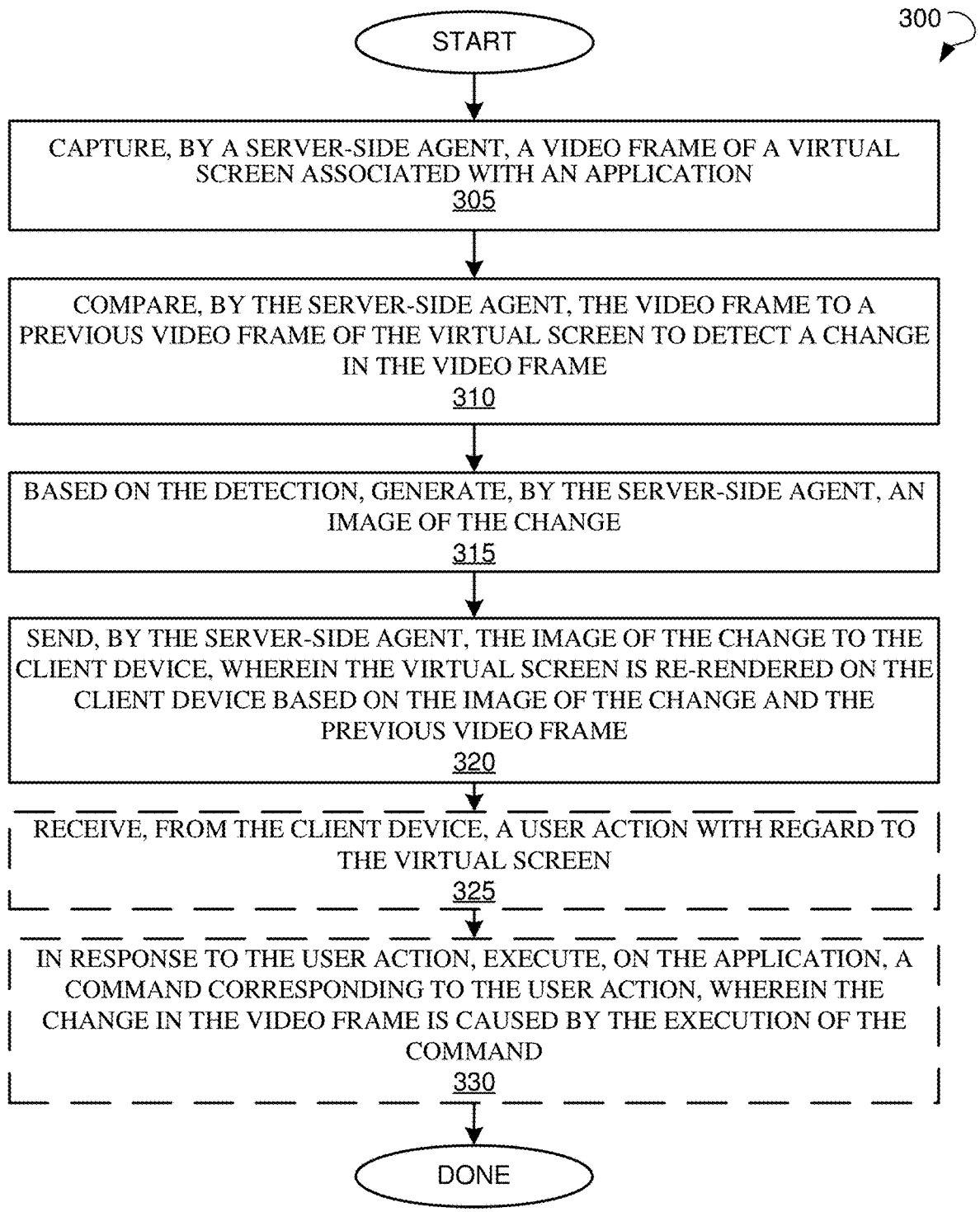
FIG. 3 illustrates a flow chart of a method for optimization of publication of an application to a web browser, according to an example embodiment.

FIG. 3 shows a process flow diagram of a method 300 for optimization of publication of an application to a web browser, according to an example embodiment. In some embodiments, the operations may be combined, performed in parallel, or performed in a different order. The method 300 may also include additional or fewer operations than those illustrated. The method 300 can be performed by processing logic that may comprise hardware (e.g., decision making logic, dedicated logic, programmable logic, and microcode), software (such as software run on a general-purpose computer system or a dedicated machine), or a combination of both.

The method 300 may commence with capturing, by a server-side agent, a video frame of a virtual screen associated with the application at operation 305. The video frame may be an electronically coded still image used in video technology. The application may be executed on an application server. In an example embodiment, the data provided to the virtual screen associated the application at operation 305 may include video data. In further example embodiments, the application may be associated with other types of data.

The method 300 may further include comparing, by the server-side agent, the video frame to a previous video frame of the virtual screen to detect a change in the video frame at operation 310. The method 300 may further include operation 315 that includes generating, by the server-side agent, an image of the change. The image of the change may be generated based on the detection of the change between the video frame and the previous video frame.

The method 300 may continue with sending, by the server-side agent, the image of the change to the client device at operation 320. In an example embodiment, the image of the change may be sent via a channel of communication established between the client device and the application server. The channel of communication may include an HTTP session between the client device and the application server. The image may be in PNG, JPG, or some other digital image format. The JPG format may be used for compression of the image.

Upon receipt of the image of the change by the web browser of the client device, the virtual screen may be re-rendered on the client device based on the image of the change and the previous video frame. The virtual screen may be re-rendered on the client device by merging a previous virtual screen and the image of the change by a script running in the web browser of the client device. The merging of the previous virtual screen and the image may be performed using double buffering of video frames. In an example embodiment, the virtual screen may be re-rendered using the HTML and the script running on the web browser.

In a further example embodiment, the virtual screen may be re-rendered in a web portal associated with a workspace. The workspace may include a plurality of applications. The plurality of applications associated with the web portal may be executed on the application server.

In an example embodiment, the method 300 may, optionally, include receiving, by the application server, from the client device, a user action with regard to the virtual screen at operation 325. In an example embodiment, the user action may include one of a keyboard event, a mouse event, and a touchscreen event. The user may perform the user action using an input device, such as a keyboard, a mouse, a touchscreen, and so forth.

At optional operation 330, a command corresponding to the user action may be executed on the application by the application server in response to the user action. The change in the video frame of the virtual screen may be caused by the execution of the command.

Figure 4:
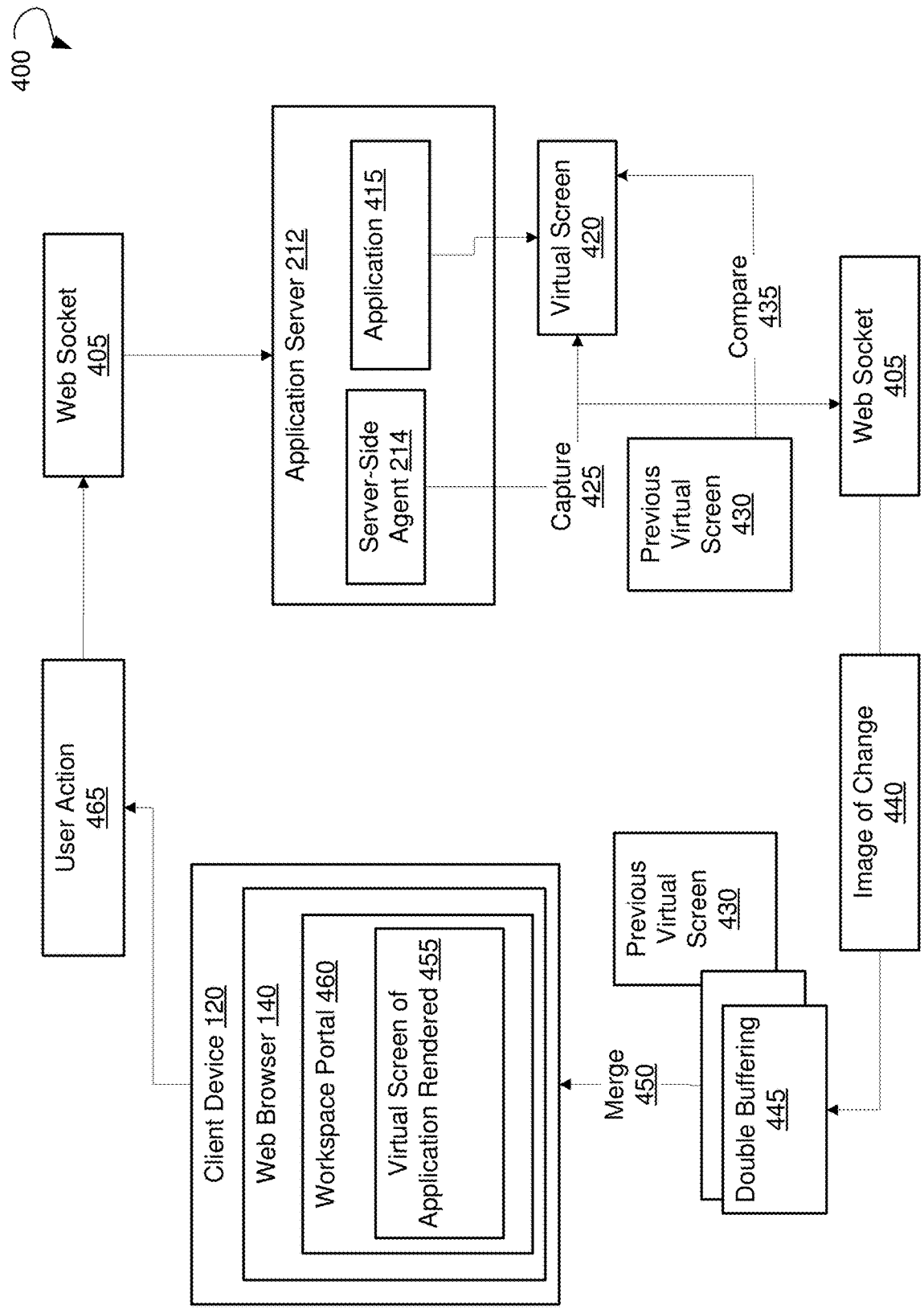
FIG. 4 is a block diagram illustrating an interaction between a client device and an application server in the course of optimization of publication of an application to a web browser running on the client device, according to an example embodiment.

FIG. 4 is a block diagram 400 illustrating interactions between a client device and an application server during publication of an application to a web browser running on the client device, according to an example embodiment.

A client device 120 may include a web browser 140. The client device 120 may establish a communication session with an application server 212. The client device 120 and the application server 212 may communicate via a web socket 405. The web socket 405 is a bidirectional communication technology for applications that operates over a single socket and is executed via a JavaScript interface in HTML5 compliant web browsers. The web socket 405 may facilitate an HTTP connection between a web browser 140 and the application server 212. The web socket 405 enables the web browser 140 to maintain a channel of communication with the application server 212 and to exchange data between the web browser 140 and the application server 212.

The web browser 140 may include a workspace portal 460. The workspace portal 460 may be associated with the application server 212 and displayed by the web browser 140. The application server 212 may include a server-side agent 214 running on the application server 212. An application 415 may be executed on the application server 212. The application server 212 may generate a virtual screen 420, which can be captured by the server-side agent 214. The server-side agent 214 may continuously monitor the virtual screen 420 associated with the application 415 and capture the virtual screen 420 as shown by arrow 425. Specifically, the server-side agent 214 may capture images of frames of the virtual screen 420. The application server 212 may store the images of the virtual screen 420 captured by the server-side agent 214 and compare each captured image of the virtual screen 420 with previously captured images of previous virtual screen 430, as shown by arrow 435. Based on the comparison, the server-side agent 214 may detect a change between the virtual screen 420 and the previous virtual screen 430. Thereafter, the server-side agent 214 may generate an image of change 440 and send the image of change 440 to the client device 120 via the web socket 405.

The client device 120 may receive the image of change 440 and use double buffering 445 to re-render the virtual screen 420 on the client side. During the double buffering 445, results of intermediate image processing (e.g., merging) operations can be stored in some region of a memory (e.g., a random-access memory (RAM)) and any such region can be called a "back buffer." When all of the image processing operations are completed, the whole region (or only the changed portion) can be copied into a region of the memory (e.g., a video RAM) called a "front buffer." The copying can be synchronized with a raster beam of a screen of the client device 120.

The web browser 140 may store the image of the previous virtual screen 430 and merge the image of the previous virtual screen 430 and the image of change 440 received from the server-side agent 214, as shown by arrow 450. Upon merger, an image of the virtual screen 420 can be obtained. Based on the image of the virtual screen 420, the virtual screen 420 of the application 415 may be re-rendered in the web browser 140 of the client device 120, as shown by virtual screen of application rendered 455.

A user of the client device 120 may view the rendered virtual screen 420 of the application 415 in the web browser 140 of the client device 120. The user may provide a user action 465 using the web browser 140. The user action 465 may include clicking the client device 120 with a mouse, entering user input via a keyboard, touching a touchscreen of the client device 120, providing user input via a voice or a gesture sensed by the client device 120, and so forth. The client device 120 can send the user action 465 to the application server 212 via the web socket 405. The application server 212 may change the virtual screen 420 associated with the application 415 in response to the user action 465.

Figure 5:
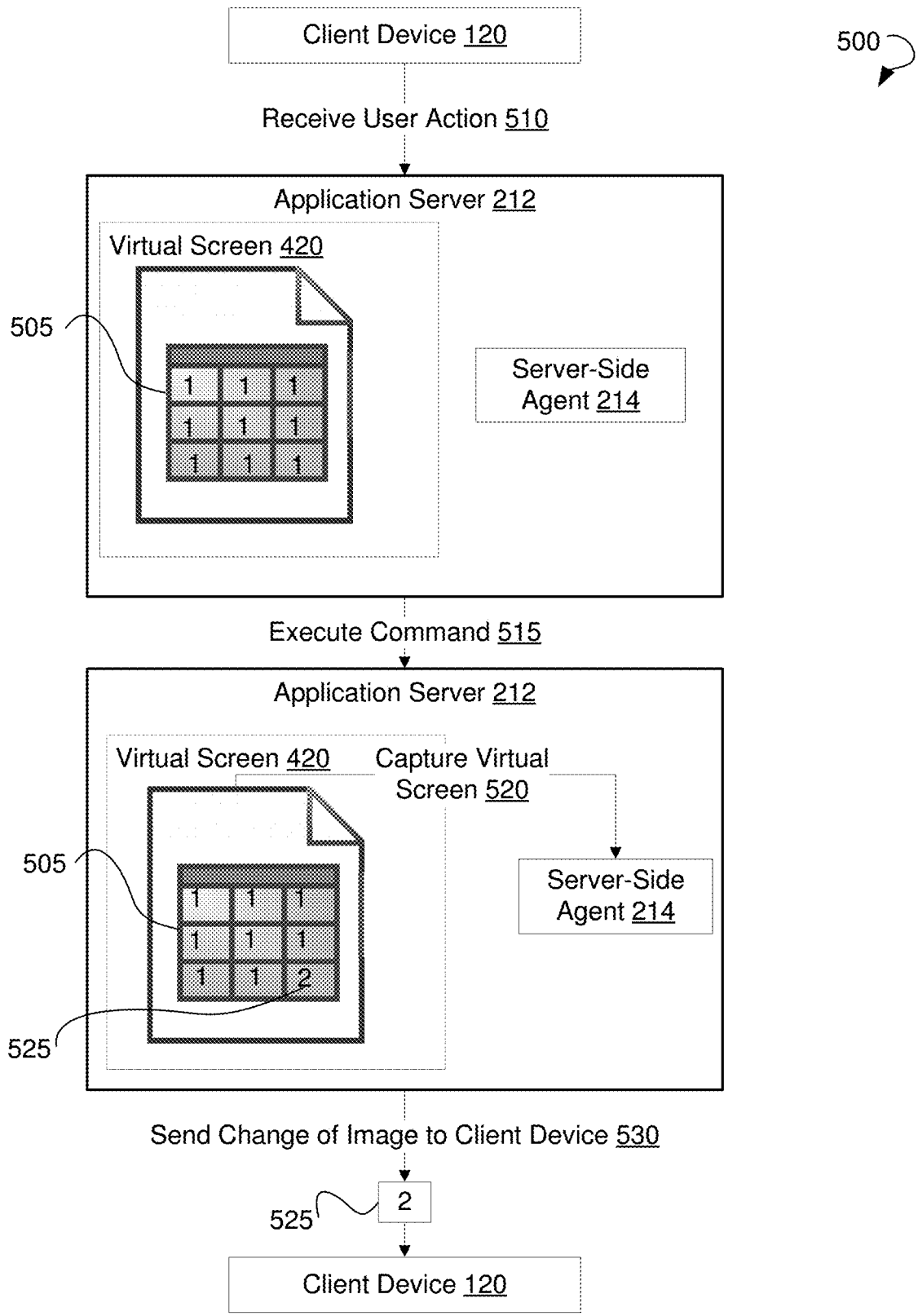
FIG. 5 is a schematic diagram illustrating sending of a change of an image in a virtual screen by an application server to a client device, according to an example embodiment.

FIG. 5 is a schematic diagram 500 illustrating communication of a change of an image of a virtual screen by an application server to a client device, according to an example embodiment. The application server 212 can establish a channel of communication with a client device 120. The application server 212 can include a server-side agent 214 that monitors and captures images of each frame of a virtual screen 420 associated with an application running on the application server 212. In the shown embodiment, the virtual screen 420 may display a table 505 (e.g., Microsoft Excel spreadsheet). The application server 212 may receive a user action at step 510 and execute a command corresponding to the user action at step 515. The virtual screen 420 of the application may change in response to the user action. The server-side agent 214 may capture an image of the changed virtual screen 420 at step 520. The change of the virtual screen 420 is shown as a change 525 in the table 505. The server-side agent 214 may detect the change 525 in the virtual screen 420 and send the image of the change 525 to the client device 120 at step 530. The server-side agent 214 may continuously monitor the virtual screen 420, capture the images of changes, and send the images of changes of the virtual screen 420 to the web browser 140. Thus, the web browser 140 may re-render all subsequent images of the virtual screen 420 associated with the application 415. A user of the web browser 140 may view the images of the virtual screen 420 published to the web browser 140 without streaming the video data from the application 415 to the web browser 140.

Figure 6:
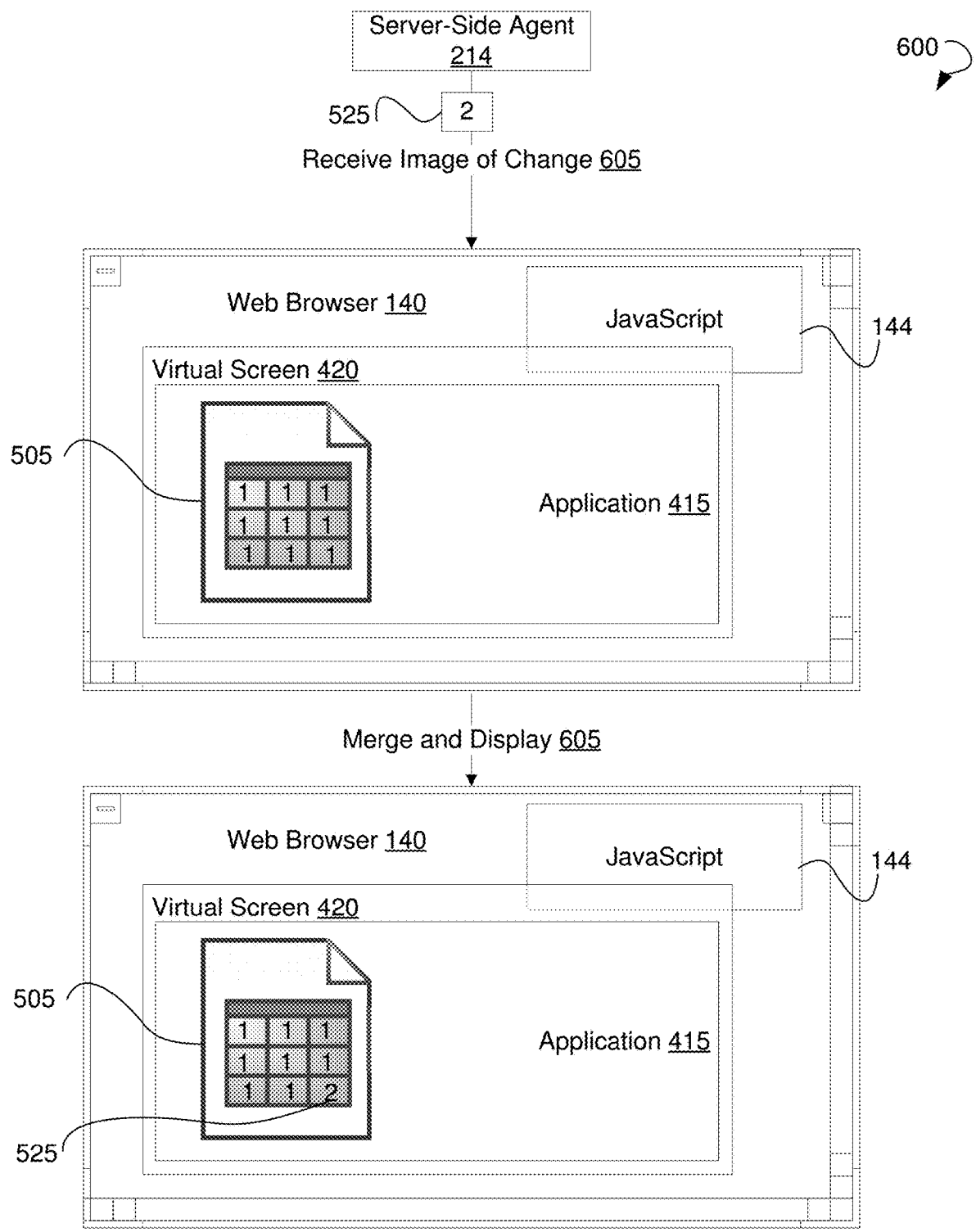
FIG. 6 is a schematic diagram illustrating rendering of an image of a virtual display based on a change of an image received by a web browser of a client device, according to an example embodiment.

FIG. 6 is a schematic diagram 600 illustrating rendering of an image of a virtual display based on a change of an image received by a web browser of a client device, according to an example embodiment. A web browser 140 may use JavaScript 144 to display images of the virtual screen 420 of the application 415. The web browser 140 may receive an image of the change 525 from the server-side agent 214 at step 605. The web browser 140 may display an image of a virtual screen 420 of an application 415. Based on the image of the change 525 received from the server-side agent 214, the web browser 140 may merge the image of the change 525 with an image of a previous virtual screen stored by the web browser at step 605. Upon merger, the web browser 140 may generate an image of the virtual screen 420 including the change 525. Step 605 further includes rendering the virtual screen 420 based on the image of the change 525 by the web browser 140 and displaying the virtual screen 420 containing the change 525 to a user of the web browser 140.

Figure 7:
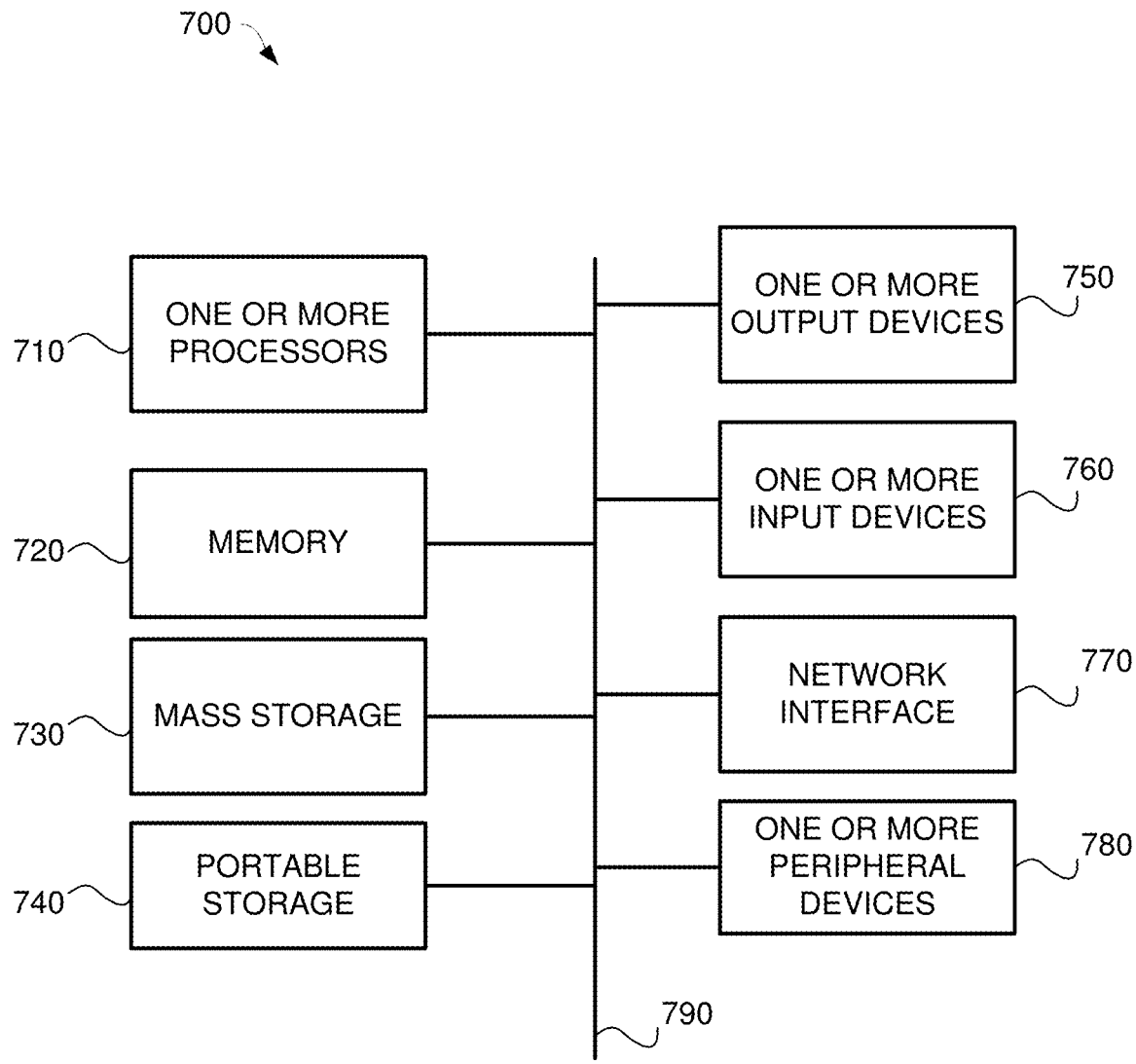
FIG. 7 is a computing system that can be used to implement a method for optimization of publication of an application to a web browser, according to an example embodiment.

FIG. 7 illustrates an exemplary computing system 700 that may be used to implement embodiments described herein. The exemplary computing system 700 of FIG. 7 may include one or more processors 710 and memory 720. Memory 720 may store, in part, instructions and data for execution by the one or more processors 710. Memory 720 can store the executable code when the exemplary computing system 700 is in operation. The exemplary computing system 700 of FIG. 7 may further include a mass storage 730, portable storage 740, one or more output devices 750, one or more input devices 760, a network interface 770, and one or more peripheral devices 780.

The components shown in FIG. 7 are depicted as being connected via a single bus 790. The components may be connected through one or more data transport means. The one or more processors 710 and memory 720 may be connected via a local microprocessor bus, and the mass storage 730, one or more peripheral devices 780, portable storage 740, and network interface 770 may be connected via one or more input/output buses.

Mass storage 730, which may be implemented with a magnetic disk drive or an optical disk drive, is a non-volatile storage device for storing data and instructions for use by a magnetic disk or an optical disk drive, which in turn may be used by one or more processors 710. Mass storage 730 can store the system software for implementing embodiments described herein for purposes of loading that software into memory 720.

Portable storage 740 may operate in conjunction with a portable non-volatile storage medium, such as a compact disk (CD) or digital video disc (DVD), to input and output data and code to and from the computing system 700 of FIG. 7. The system software for implementing embodiments described herein may be stored on such a portable medium and input to the computing system 700 via the portable storage 740.

One or more input devices 760 provide a portion of a user interface. The one or more input devices 760 may include an alphanumeric keypad, such as a keyboard, for inputting alphanumeric and other information, or a pointing device, such as a mouse, a trackball, a stylus, or cursor direction keys. Additionally, the computing system 700 as shown in FIG. 7 includes one or more output devices 750. Suitable one or more output devices 750 include speakers, printers, network interfaces, and monitors.

Network interface 770 can be utilized to communicate with external devices, external computing devices, servers, and networked systems via one or more communications networks such as one or more wired, wireless, or optical networks including, for example, the Internet, intranet, LAN, WAN, cellular phone networks (e.g., Global System for Mobile communications network, packet switching communications network, circuit switching communications network), Bluetooth radio, and an IEEE 802.11-based radio frequency network, among others. Network interface 770 may be a network interface card, such as an Ethernet card, optical transceiver, radio frequency transceiver, or any other type of device that can send and receive information. Other examples of such network interfaces may include Bluetooth®, 3G, 4G, and WiFi® radios in mobile computing devices as well as a USB.

One or more peripheral devices 780 may include any type of computer support device to add additional functionality to the computing system. The one or more peripheral devices 780 may include a modem or a router.

The components contained in the exemplary computing system 700 of FIG. 7 are those typically found in computing systems that may be suitable for use with embodiments described herein and are intended to represent a broad category of such computer components that are well known in the art. Thus, the exemplary computing system 700 of FIG. 7 can be a personal computer, hand held computing device, telephone, mobile computing device, workstation, server, minicomputer, mainframe computer, or any other computing device. The computer can also include different bus configurations, networked platforms, multi-processor platforms, and so forth. Various operating systems (OS) can be used including UNIX, Linux, Windows, Macintosh OS, Palm OS, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the example embodiments. Those skilled in the art are familiar with instructions, processor(s), and storage media.

It is noteworthy that any hardware platform suitable for performing the processing described herein is suitable for use with the example embodiments. The terms "computer-readable storage medium" and "computer-readable storage media" as used herein refer to any medium or media that participate in providing instructions to a central processing unit (CPU) for execution. Such media can take many forms, including, but not limited to, non-volatile media, volatile media, and transmission media. Non-volatile media include, for example, optical or magnetic disks, such as a fixed disk. Volatile media include dynamic memory, such as RAM. Transmission media include coaxial cables, copper wire, and fiber optics, among others, including the wires that include one embodiment of a bus. Transmission media can also take the form of acoustic or light waves, such as those generated during radio frequency and infrared data communications. Common forms of computer-readable media include, for example, a floppy disk, a flexible disk, a hard disk, magnetic tape, any other magnetic medium, a CD-read-only memory (ROM) disk, DVD, any other optical medium, any other physical medium with patterns of marks or holes, a RAM, a PROM, an EPROM, an EEPROM, a FLASHEPROM, any other memory chip or cartridge, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Thus, various embodiments of methods and systems for optimization of publication of an application to a web browser have been described. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense. There are many alternative ways of implementing the present technology. The disclosed examples are illustrative and not restrictive.

What is claimed is:

1. A method for optimization of publication of an application to a web browser, the method comprising:
  continuously monitoring, by a server-side agent, a virtual screen associated with the application, the virtual screen displaying video data comprising a plurality of video frames;
  capturing, by the server-side agent, a video frame of the plurality of the video frames for the virtual screen associated with the application;
  comparing, by the server-side agent, the video frame of the plurality of the video frames to a previous video frame of the plurality of the video frames of the virtual screen to detect a change in the video frame;
  based on the detection, generating, by the server-side agent, an image of the change; and
  sending, by the server-side agent, the image of the change to a client device, wherein the virtual screen is re-rendered on the client device based on the image of the change and the previous video frame, the virtual screen being re-rendered by merging the previous virtual screen and the image of the change by a script running in a web browser of the client device, wherein the server-side agent captures all of the plurality of video frames of the video data;
  wherein the virtual screen is re-rendered inside a web portal associated with a workspace, the workspace including a plurality of applications.

2. The method of claim 1, further comprising:
  receiving, from the client device, a user action with respect to the virtual screen; and
  in response to the user action, executing, on the application, a command corresponding to the user action, wherein the change in the video frame is caused by the execution of the command.

3. The method of claim 2, wherein the user action includes one of a keyboard event, a mouse event, and a touchscreen event.

4. The method of claim 1, wherein the merging the previous virtual screen and the image of the change is performed using double buffering of video frames.

5. The method of claim 1, wherein the application is executed on an application server.

6. The method of claim 5, wherein the image is sent via a channel of communication established between the client device and the application server.

7. The method of claim 6, wherein the channel of communication includes a Hypertext Transfer Protocol (HTTP) session.

8. The method of claim 1, wherein the virtual screen is re-rendered using Hypertext Markup Language (HTML) and a script running in the web browser.

9. The method of claim 1, wherein the image is in one of the following formats: PNG and JPG.

10. The method of claim 9, wherein the JPG format is used for compression of the image.

11. The method of claim 1, wherein the plurality of applications associated with the web portal are executed on an application server.

12. A system for optimization of publication of an application to a web browser, the system comprising:
- an application server configured to run the application; and
- a server-side agent configured to:
  - continuously monitor a virtual screen associated with the application, the virtual screen displaying video data comprising a plurality of video frames;
  - capture a video frame of the plurality of the video frames for the virtual screen associated with the application;
  - compare the video frame of the plurality of the video frames to a previous video frame of the plurality of the video frames of the virtual screen to detect a change in the video frame;
  - based on the detection, generate an image of the change; and
  - send the image of the change to a client device, wherein the virtual screen is re-rendered on the client device based on the image of the change and the previous video frame, the virtual screen being re-rendered by merging the previous virtual screen and the image of the change by a script running in a web browser of the client device, wherein the server-side agent captures all of the plurality of video frames of the video data;
  - wherein the virtual screen is re-rendered inside a web portal associated with a workspace, the workspace including a plurality of applications.

13. The system of claim 12, wherein the application server is configured to:
- receive, from the client device, a user action with respect to the virtual screen; and
- in response to the user action, execute, on the application, a command corresponding to the user action, wherein the change in the video frame is caused by the execution of the command.

14. The system of claim 13, wherein the user action includes one of a keyboard event, a mouse event, and a touchscreen event.

15. The system of claim 12, wherein merging the previous virtual screen and the image of the change is performed using double buffering of video frames.

16. The system of claim 12, wherein the application is executed on the application server.

17. A system for optimization of publication of an application to a web browser, the system comprising:
- a server-side agent configured to:
  - continuously monitor a virtual screen associated with the application, the virtual screen displaying video data comprising a plurality of video frames;
  - capture a video frame of the plurality of the video frames for the virtual screen associated with the application;
  - compare the video frame of the plurality of the video frames to a previous video frame of the plurality of the video frames of the virtual screen to detect a change in the video frame;
  - based on the detection, generate an image of the change; and
  - send the image of the change to a client device, wherein the virtual screen is re-rendered on the client device based on the image of the change and the previous video frame, the virtual screen being re-rendered by merging the previous virtual screen and the image by a script running in the web browser of the client device using double buffering of video frames, wherein the server-side agent captures all of the plurality of video frames of the video data;
  - wherein the virtual screen is re-rendered inside a web portal associated with a workspace, the workspace including a plurality of applications; and
- an application server configured to:
  - run the application;
  - receive, from the client device, a user action with regard to the virtual screen, the user action including one of a keyboard event and a mouse event; and
  - in response to the user action, execute, on the application, a command corresponding to the user action, wherein the change in the video frame is caused by the execution of the command.

* * * * *